July 18, 1967  W. SCHILLING  3,331,154
PLANT CULTIVATING DEVICE
Filed Feb. 23, 1965
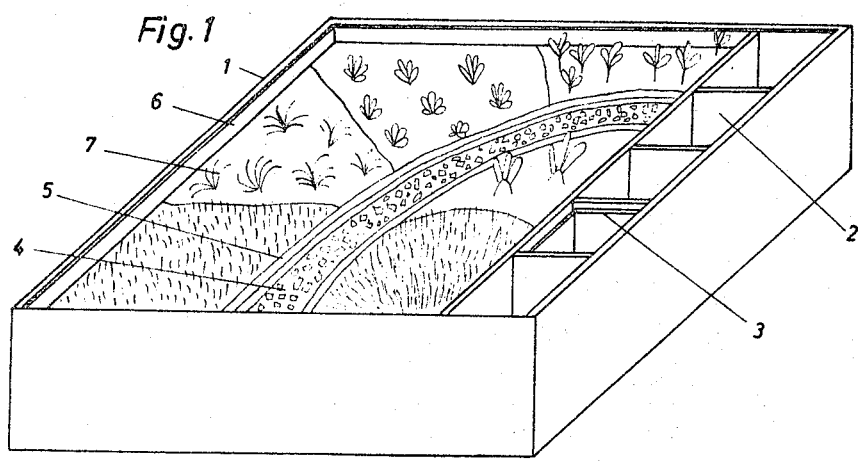
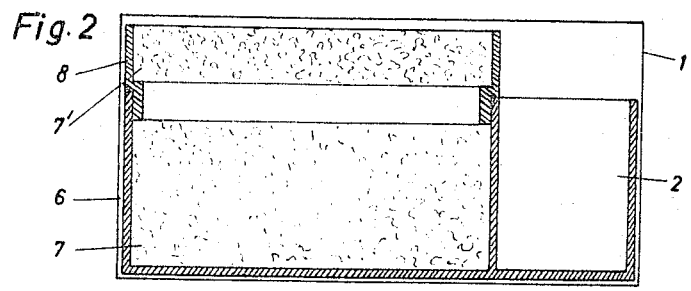
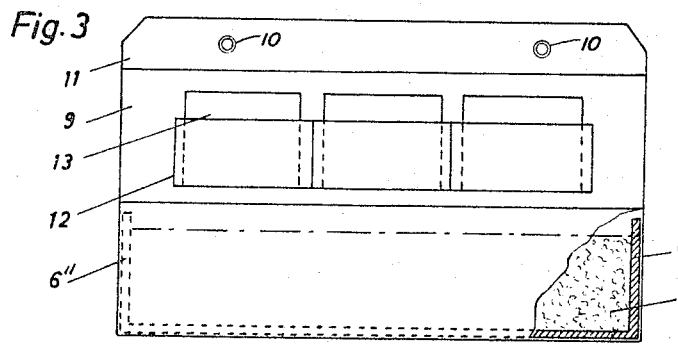
Inventor
Werner Schilling
By Richard Emf
Ag't ns Office 3,331,154
Patented July 18, 1967

3,331,154
PLANT CULTIVATING DEVICE
Werner Schilling, Buchenweg 1, Weinheim,
Bergstrasse, Germany
Filed Feb. 23, 1965, Ser. No. 434,218
Claims priority, application Germany, Apr. 4, 1964,
Sch 34,911
1 Claim. (Cl. 47—34)

The present invention relates to a toy garden which makes it possible to carry out all the work occurring in a garden as a play and on a small scale.

It is the purpose of the invention to cause and to observe the germinating of seeds and the development of plants including their roots as a play.

The plate cultivating device according to the invention comprises a wooden or cardboard box with at least one bowl- or pot-shaped insert made of plastic material, at least one plate or mat of hydrophilic plastic foam containing nutritive salts and trace elements and seeds or the like.

A plastic foam plate as carrier for seeds or young plants provides easy and clean handling of a bed for plant cultivation as it is not only a one-piece object, but also retains humidity. On the other hand, such plates can easily be broken so that the root development can readily be observed. The plates are originally white. For observing the development of the roots it is, therefore, favorable to use plates of uncolored plastic foam. Plates broken for the purpose cited hereinbefore can easily be joined again without severely damaging the roots.

The plastic foam plate may have the seeds already placed thereon. Thereby, the playing child sees directly how to do the correct laying of seeds.

The wooden or cardboard box or its insert or inserts may contain receptacles for seeds and soil cultivating means, e.g. small garden utensils. Preferably, quickly germinating seeds as e.g. cress, grass seeds or the like are provided.

The compartments may be arranged so that they can be lifted. Pot-shaped plastic inserts may be provided so that several may be nested one in another in one single compartment. By means of these inserts it is possible, e.g., to fill them with plastic foam particles taken from the plate and to put individual seeds into them or to transplant young plants taken from the large bed. Single compartments may also serve to keep soil covering means, as gravel and/or subdividing strips, so that the single plastic foam plate may be handled according to the desire of the playing child with gravel-covered paths and edges of such paths, and single beds may be delimited by such strips.

Furthermore, a plastic ring corresponding to the plastic bowl to be put onto it may be provided with inserted plates of plastic foam. By means of such a plastic ring one or several further plastic foam plates may be kept in reserve without the first plate of plastic foam with plants already grown thereon being damaged when the parts of the toy are put together.

Waterproof and moisture-resistant foils may also be provided; when playing, the foils together with several plates of plastic foam may serve as an underlayer or to substitute a bowl or pot.

The wooden or cardboard box may have a tilting lid with suspension eyelets so that it may be stored away suspended on a wall in open condition.

The lid of the wooden or cardboard box may be provided on its lower side with pockets for seed bags.

Further embodiments of the invention will now be described by way of example with reference to the accompanying drawing in which:

FIG. 1 is a box with the lid taken away, seen obliquely from the front,

FIG. 2 is a sectional view of another embodiment of such a box without a lid, and FIG. 3 is a partially sectionally shown view of a box with its tilting lid in vertical position.

According to FIG. 1 there are provided in a wooden or cardboard box 1 with compartments 2 for storing seeds, gravel, small utensils as a miniature spade, rake, a pot of plastic material 3, etc., a bowl shaped insert or tray 6 of plastic material, e.g. of Styropor. In the bowl 6 there is arranged a plate 7 of plastic foam of, e.g., 9/16" thickness, which plate is hydrophilic and contains nutritive salts and trace elements for the plant growth. This plate may be made, e.g., of foamed urea formaldehyde resin or formed melamine formaldehyde resin or a combination of such foamed materials. Plates of plastic foam made of a foaming agent foam prepared with air or oxygen and hardened by means of the aforesaid synthetic resins are particularly used. Such a foam is prepared, e.g., by foaming with air a solution of a foaming agent containing oxalic acid and by mixing the obtained foam with the solution of a urea formaldehyde precondensate.

The surface of the plastic foam plate 7 is subdivided by dividing strips 5 to form with the gravel layer 4 a single path and individual beds. Each bed has been cultivated with a specific type of seed so that different small plants will grow on the foam plate subdivided into beds.

According to FIG. 2 which shows a box not yet used for planting, a plastic ring 8 carrying a plastic foam plate 7' is placed on top of a bowl like bowl 6 of FIG. 1, which holds a plastic foam plate-like plate 7 of FIG. 1.

According to FIG. 3 a bowl-shaped insert 6" with a foam plastic plate 7" is arranged in a cardboard box with tilting lid 9 and a fitting edge portion 11 on this lid. This edge portion 11 has suspension eyelets 10.

On one side of the tilting lid 9 pockets 12 are provided in which bags 13 with seeds are stored.

The plastic foam plate serves as a substitute for earth and must only be kept humid for the growing of the plants. One or more plastic foam plates may be laid under a plate already carrying plants. By means of the plant cultivating device according to the invention it is also possible to cultivate plants indoors in the cold months and to plant them later on in the garden. The arrangement is equally light in weight when using plastic foam plates of larger dimensions, about 1 meter long and 1 meter wide, as the bowl of plastic material for the foam plastic plate may be very thin, e.g. only 1 mm. thick. It is easy, therefore, to carry the complete device to another place. When being replanted the young plants may be broken away from the plate with all their roots and be planted into the garden soil.

I claim:
A toy garden comprising
(a) a boxlike structure including a bottom and side walls, said bottom and said side walls defining a space,
(b) walls subdividing said space into a number of smaller compartments and at least a single larger compartment,
(c) at least a single tray having such dimensions as to removably fit into said larger compartment.
(d) at least a single spongy plastic mat of hydrophilic and seed-germinating properties, said mat fitting into said tray, said tray and said mat being withdrawable from said larger compartment and returnable as a unit,
(e) a ring to sit on top of said tray when within said larger compartment, and

(f) another spongy plastic mat of hydrophilic and seed-germinating properties supported by said ring, said ring having a wall, said wall being offset intermediate the edges thereof and thus forming two adjacent shoulders, one of said shoulders permitting said ring to sit on said tray, the other of said shoulders forming a seat to support said other mat at a distance from said first named mat, said ring and said other mat being removable from said tray and returnable as a unit.

References Cited

UNITED STATES PATENTS

| | | | |
|---|---|---|---|
| 852,812 | 5/1907 | Vernon | 47—34.13 X |
| 2,046,236 | 6/1936 | Ball | 47—34.13 |
| 2,318,711 | 5/1943 | Phelan | 47—34.13 |
| 2,965,584 | 12/1960 | Elkin | 260—2.5 |
| 3,154,884 | 11/1964 | Amar et al. | 47—56 X |

FOREIGN PATENTS 159,441   3/1921   Great Britain.

ABRAHAM G. STONE, *Primary Examiner.*

P. A. RAZZANO, *Assistant Examiner.*